(12) United States Patent
Huang et al.

(10) Patent No.: US 10,449,434 B2
(45) Date of Patent: Oct. 22, 2019

(54) WATER FLOW CONTROL DEVICE FOR SWIMMING TRAINING

(71) Applicant: BESTWAY INFLATABLES & MATERIAL CORP., Shanghai (CN)

(72) Inventors: Shuiyong Huang, Shanghai (CN); Wenhua Hu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 343 days.

(21) Appl. No.: 15/437,342

(22) Filed: Feb. 20, 2017

(65) Prior Publication Data

US 2018/0178104 A1 Jun. 28, 2018

(30) Foreign Application Priority Data

Dec. 27, 2016 (CN) .................... 2016 2 1444926 U

(51) Int. Cl.
*A63B 69/12* (2006.01)
*B01D 35/26* (2006.01)
(Continued)

(52) U.S. Cl.
CPC ............ *A63B 69/125* (2013.01); *B01D 35/26* (2013.01); *C02F 1/004* (2013.01); *C02F 1/008* (2013.01); *C02F 9/005* (2013.01); *E04H 4/1209* (2013.01); *A63B 24/00* (2013.01); *A63B 2220/13* (2013.01); *A63B 2220/70* (2013.01);
(Continued)

(58) Field of Classification Search
CPC ... A63B 69/12; A63B 69/125; A63B 21/0084; A63B 2244/20; A63B 2208/03; A63B 2220/80; A63B 2220/833; A63B 24/00; Y10S 4/904; C02F 1/008; C02F 1/283;
(Continued)

(56) References Cited

U.S. PATENT DOCUMENTS 3,534,413 A * 10/1970 Plaseraud ............ A63B 69/125
4/492
3,820,173 A * 6/1974 Weller ................. A63B 69/125
210/167.1
(Continued)

FOREIGN PATENT DOCUMENTS

| AU | 2009202334 B2 | 11/2015 | |
| JP | H01-170481 A | 7/1989 | |
| JP | 2544843 B2 * | 10/1996 | ........... A63B 69/125 |

*Primary Examiner* — Terry K Cecil
(74) *Attorney, Agent, or Firm* — AJ Moss; Dickinson Wright PLLC

(57) ABSTRACT

Disclosed is a water flow control device for swimming training that includes a swimming training device and a main water inlet pipe and a main water outlet pipe. The swimming training device includes at least a swimming pump. The main water inlet pipe and the main water outlet pipe are connected with the swimming pump. The water inlet of the main water inlet pipe is communicated with a swimming pool and a water outlet of the main water outlet pipe is connected with a jet nozzle. A filter device includes at least a filter pump, a filter sterilization device. A filter water inlet pipe and a filter water outlet pipe are connected with the filter pump. The filter water inlet pipe is communicated with the swimming pool through the filter sterilization device and the filter water outlet pipe communicated with the main water inlet pipe.

16 Claims, 4 Drawing Sheets

(51) Int. Cl.
*C02F 1/00* (2006.01)
*C02F 1/32* (2006.01)
*E04H 4/12* (2006.01)
*C02F 9/00* (2006.01)
*C02F 1/28* (2006.01)
*C02F 103/42* (2006.01)
*A63B 24/00* (2006.01)

(52) U.S. Cl.
CPC ..... *A63B 2220/80* (2013.01); *A63B 2220/801* (2013.01); *A63B 2220/833* (2013.01); *A63B 2225/50* (2013.01); *A63B 2244/20* (2013.01); *C02F 1/001* (2013.01); *C02F 1/283* (2013.01); *C02F 1/32* (2013.01); *C02F 1/325* (2013.01); *C02F 2103/42* (2013.01); *C02F 2201/005* (2013.01); *C02F 2209/40* (2013.01); *C02F 2209/42* (2013.01); *C02F 2303/04* (2013.01); *E04H 4/1281* (2013.01)

(58) Field of Classification Search
CPC .... C02F 1/32; C02F 2303/04; C02F 2103/42; C02F 2209/42; B01D 35/26; E04H 4/1209
See application file for complete search history.

(56) References Cited

U.S. PATENT DOCUMENTS

| | | | |
|---|---|---|---|
| 5,787,519 A | 8/1998 | Smith | |
| 6,003,164 A | 12/1999 | Leaders | |
| 6,151,726 A * | 11/2000 | Ajima | A63B 69/125 4/488 |
| 2015/0128338 A1 | 5/2015 | Royster et al. | |

* cited by examiner

WATER FLOW CONTROL DEVICE FOR SWIMMING TRAINING

BACKGROUND INFORMATION

Technical Field

The present invention is related to the technical field of water flow control for swimming training, and more particularly related to a water flow control device for swimming training.

Background

At present for the common ground pool and the assembled ground pool, due to space constraints, generally only for family fun, cannot be used as swimming training. Currently, swimming training devices in the market are mainly installed in ground swimming pools and include axial-flow type swimming training devices and jet type swimming training devices. The axial-flow type training devices generally use hydraulic transmission device or direct-current power supply. The hydraulic transmission device are relatively heavy and high cost. And the direct-current power supplied device is low power and low water dynamic, so the training effect is not ideal. While for the above-mentioned jet-type swimming training device, the water flows are concentrated on several points and would directly hit human faces easily, thus lead to a bad experience feeling. Besides, when the above-mentioned swimming training devices are used, a manual vacuuming action is required to activate the swimming training devices to realize a water circulation.

SUMMARY

In view of the disadvantages of the prior art described above, the instant disclosure provides a water flow control device for swimming training for solving the problem of bad water flow control in the prior art.

The embodiment of the instant disclosure provides a water flow control device for swimming training that includes following components.

A swimming training device includes at least a swimming pump, and a main water inlet pipe and a main water outlet pipe connected with the swimming pump. A water inlet of the main water inlet pipe is communicated with a swimming pool and a water outlet of the main water outlet pipe connected with a jet nozzle.

A filter device includes at least a filter pump, a filter sterilization device, and a filter water inlet pipe and a filter water outlet pipe connected with the filter pump. The filter water inlet pipe is communicated with the swimming pool through the filter sterilization device and the filter water outlet pipe communicated with said main water inlet pipe.

A control device includes a main controller, a first control switch for controlling start and stop of the swimming pump, a second control switch for controlling start and stop of the filter pump, and a water level sensor for detecting a water level in the main water inlet pipe. The first control switch, second control switch and water level sensor are all connected with the main controller.

The water flow control device further includes a swimming pump overcurrent protective mechanism that includes a swimming pump current detector for detecting current in the swimming pump, and a swimming pump overcurrent protective circuit connected with the swimming pump current detector. The swimming pump overcurrent protective circuit is connected with the start circuit in the swimming pump.

The water flow control device may further include a swimming pump abnormality protective mechanism that includes a swimming pump parameter detector for detecting operating state of the swimming pump, and a swimming pump abnormality protective circuit connected with the swimming pump parameter detector. The swimming pump abnormality protective circuit is connected with the start circuit in the swimming pump.

The parameters detected by the swimming pump parameter detector include a rotational speed value and a temperature value of the swimming pump during operation.

The water flow control device may further include a filter pump overcurrent protective mechanism that includes a filter pump current detector for detecting current in the filter pump, and a filter pump overcurrent protective circuit connected with the filter pump current detector. The filter pump overcurrent protective circuit is connected with the start circuit in the filter pump.

The water flow control device may further include a filter pump abnormality protective mechanism that includes a filter pump parameter detector for detecting operating state of the filter pump, and a filter pump abnormality protective circuit connected with the filter pump parameter detector. The filter pump abnormality protective circuit is connected with a start circuit in the filter pump.

The parameters detected by the filter pump parameter detector include a rotational speed value and a temperature value of the filter pump during operation.

The water flow control device may further include a 230V/120V power supply, one side connected with the swimming pump and the filter pump, and the other side connected with the main controller through a step-down circuit.

The step-down circuit may further include with a manual start switch.

The filter pump is a 12V low-voltage motor pump and the power supply is connected with the filter pump through a voltage transformation circuit.

The main water outlet pipe is configured with a flow control valve.

The flow control valve is a manual control valve.

The flow control valve is a remote control valve connected with the main controller.

The main control has a wireless communication module and communicated with the first control switch and the second control switch, respectively, via the wireless communication module.

The main controller is a wearable device or a portable electronic terminal.

The filter sterilization device comprises a sand filter module, a carbon filter module, a filter element filter module and an UV sterilization module.

As described above, the water flow control device for swimming training in accordance with the instant disclosure has the following beneficial effects: as the filter water outlet pipe of the filter pump is in communicated with the main water inlet pipe and the main water inlet pipe is the water inlet pipe of the swimming pump, the swimming pump realizes the vacuum by starting up the filter pump and then initial start the water circulation without manual external force, so that the water flow control device in accordance with the instant disclosure can form a water circulating effect at the beginning.

DETAILED DESCRIPTION

Figure 1:
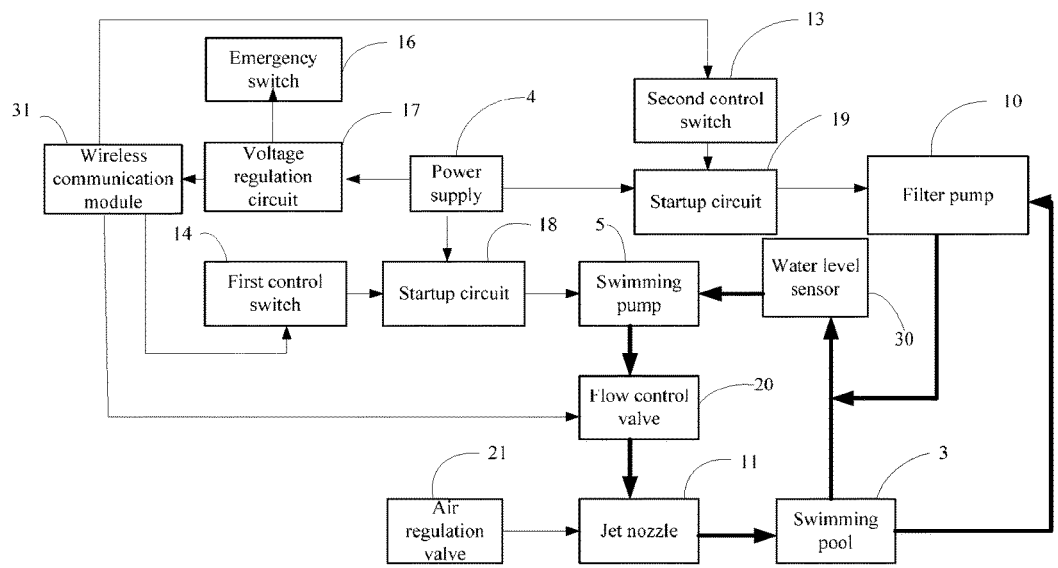
FIG. 1 illustrates a schematic diagram of a water flow control device for swimming training according to the present disclosure.

As illustrated in FIG. 1, the embodiment of the instant disclosure provides a water flow control device for swimming training that include following components.

A swimming training device includes at least a swimming pump 5, and a main water inlet pipe and a main water outlet pipe connected with the swimming pump 5, a water inlet of the main water inlet pipe communicated with a swimming pool 3 and a water outlet of the main water outlet pipe connected with a jet nozzle 11.

A filter device includes at least a filter pump 10, a filter sterilization device, and a filter water inlet pipe and a filter water outlet pipe connected with the filter pump 10. The filter water inlet pipe is communicated with the swimming pool 3 through the filter sterilization device and the filter water outlet pipe is communicated with the main water inlet pipe. The thick line in FIG. 1 indicates the direction of the water flow.

A control device includes a main controller, a first control switch 12 for controlling start and stop of the swimming pump 5, a second control switch 13 for controlling start and stop of the filter pump 10 and a water level sensor 30 for detecting a water level in the main water inlet pipe. The first control switch 13, the second control switch 14 and the water level sensor 30 are all connected with the main controller.

For the water flow control device for swimming training in accordance with the instant disclosure, the filter water outlet pipe of the filter pump is in communicated with the main water inlet pipe. The swimming pump realizes the vacuum by starting up the filter pump to make the water enter the swimming pump and then forms a water circulating effect at the beginning, so that a rapid start of the swimming pump would be achieved without manual external force.

Figure 4:
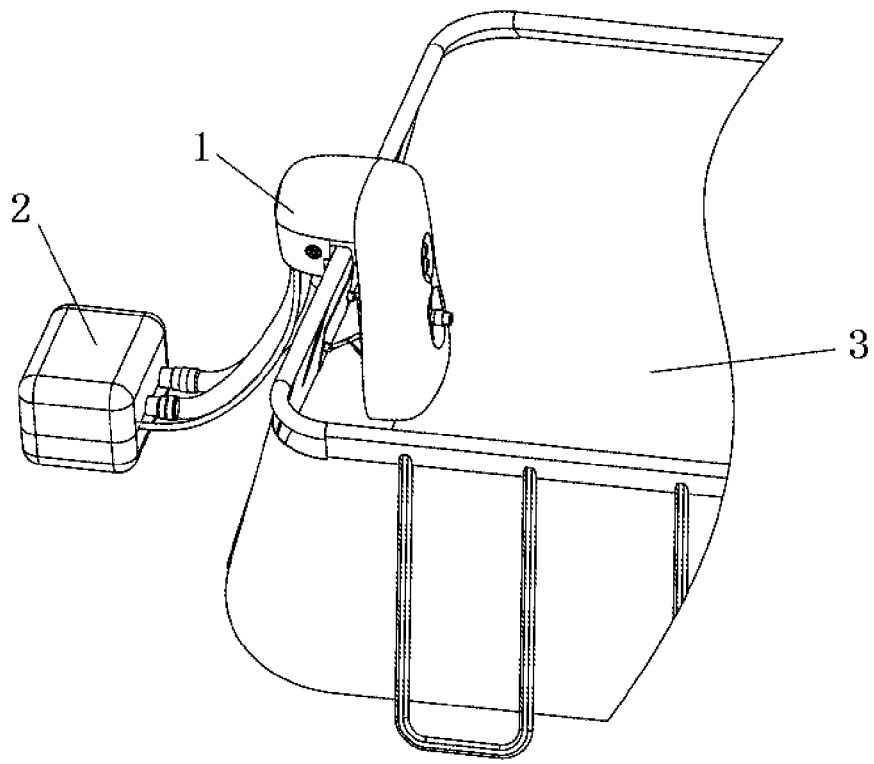
FIG. 4 illustrates a schematic view of an in-situ swimming training device and a swimming pool using the present disclosure.
Figure 5:
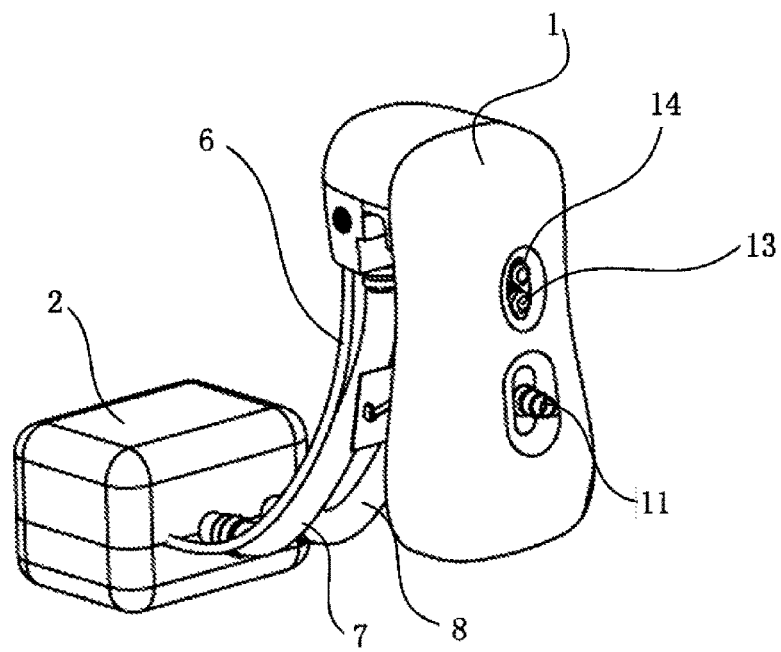
FIG. 5 illustrates an external view of an in-situ swimming training device according to an embodiment of the present disclosure.
Figure 6:
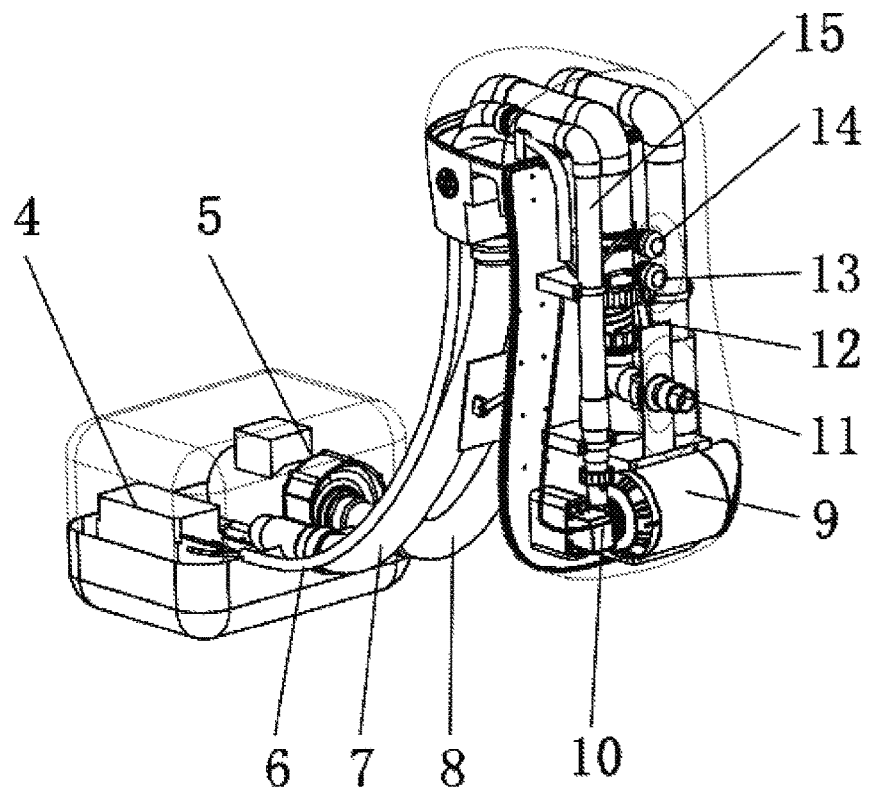
FIG. 6 illustrates a schematic view of an internal pipeline of the in-situ swimming training device illustrated in FIG. 5.
Figure 7:
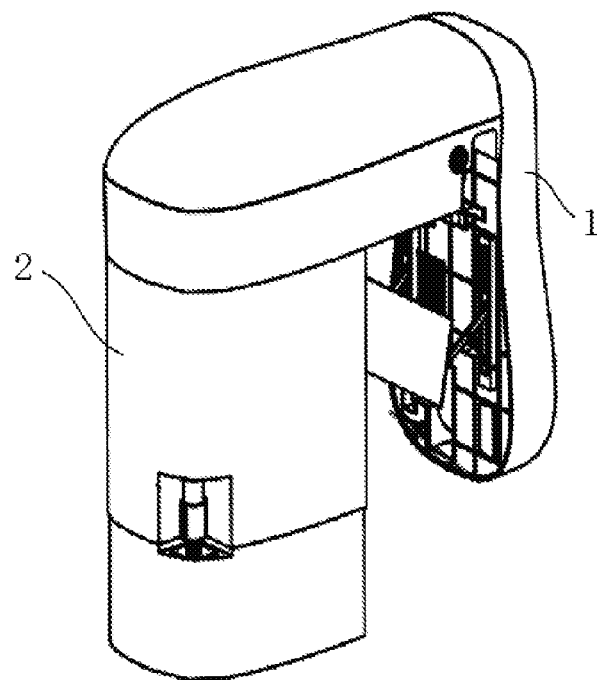
FIG. 7 illustrates an external view of an in-situ swimming training device according to another embodiment of the present disclosure.

Please refer to FIG. 4. FIG. 4 illustrates a schematic view of a swimming training device and a swimming pool using the present disclosure. The water flow control device for swimming training in accordance with the present disclosure is used in the swimming training device. FIG. 5 illustrates an external view of an in-situ swimming training device according to an embodiment of the present disclosure. FIG. 6 illustrates a schematic view of an internal pipeline of the swimming training device illustrated in FIG. 5. FIG. 7 illustrates an external view of a swimming training device according to another embodiment of the present disclosure. As illustrated in FIG. 5 to FIG. 7, the swimming training device used in this embodiment is of a hydro-electromechanical separation design, which mainly refers to that the swimming pump 5 and the power supply 4 are independently in the first housing 2, while the filter pump 10, the filter sterilization device 9 and the jet nozzle 11 are all included on the second housing 1. The specific pipeline structure is as illustrated in FIG. 6, the main water inlet pipe 7 and the main water outlet pipe 8 are connected with the swimming pump 5, the water inlet of the main water inlet pipe 7 is communicated with the swimming pool 3 and the water outlet of the main water outlet pipe 8 is connected with the jet nozzle 11. The filter water inlet pipe and a filter water outlet pipe 15 are connected with the filter pump 10. The filter water inlet pipe is communicated with the swimming pool 3 through the filter sterilization device 9. The filter water outlet pipe 15 is communicated with the main water inlet pipe 7. The first control switch 14 and the second control switch 13 are also included on the second housing 1 and are connected with the power supply 4 and the controller through the control pipeline 6. The jet nozzle is further connected with an air regulation valve 21 (seen FIG. 1) through an air pipe 12. Herein, the swimming training device, illustrated in FIG. 7, packaged the exposed pipeline in the swimming training device, illustrated in FIG. 5 with a third housing, and connected the first housing and the second housing are through the third housing.

A water flow control method for swimming training may be implemented by using the above-described water flow control device for swimming training.

Start the filter pump 10, and then the filter pump 10 pumps water from the swimming pool 3 into the swimming pump 5 to form the first state of water circulation.

Start the swimming pump 5, and then the swimming pump 5 starts to pump water at a preset time. In particular, the time is required for the filter pump to be operated to complete the evacuation of the swimming pump, the swimming pump 5 pumps water from the swimming pool 3. The pressurized reflow is injected to the swimming pool 3 through a jet nozzle 11 to form a second state of water circulation.

When the second state of water circulation is formed, that is, when the swimming pump 5 is started, the filter pump 10 is stopped correspondingly at the above-mentioned preset time.

The first state of water circulation refers to that start the filter pump 10 pump the water from the swimming pool into the filter pump pipeline. Herein, the filter pump pipeline includes the filter water inlet pipe and the filter water outlet pipe connected with the filter pump 10. Then, water enter the swimming pump 5 through the main water inlet pipe 7 and circulated back into the swimming pool 3 through the main water outlet pipe 8. The first state of water circulation is a state that the swimming pump 5 is evacuated, and the operation is performed when the swimming training device is initially installed and used, or when it is necessary to evacuate the swimming pump of the swimming training device.

The second state of water circulation refers to that start the swimming pump 5 to pump the water from the swimming pool 3 into the swimming pump 5 through the main water inlet pipe 7 and the filter pump pipeline. Then, water is circulated back into the swimming pool through the main water outlet pipe 8 and the jet nozzle 11, such that a circulating "river" can be formed in the swimming pool with the inflow and outflow of the water. The second state of water circulation is a training available water flow formed after the normal start of the swimming pump.

The above-described water flow control method for swimming training may further include judging whether the swimming pump 5 is in an evacuated state or not. When the swimming pump 5 is in the evacuated state, the swimming pump 5 is activated to directly form the second state of water circulation. If vacuuming is needed, start the filter pump 10 to form the first state of water circulation, and then start the swimming pump 5 after the preset time to form the second state of water circulation.

The above-described water flow control method may further includes detecting a water level of the main water inlet pipe 7, through the water level sensor 30 included in the main water inlet pipe 7. When the detected water level is higher than the preset depth value, start the swimming pump 5. When the detected water level is lower than the preset depth value, and the operation time of the filter pump 10 reaches the preset time, stop the filter pump. By detecting the water level through the water level sensor and judging the detected water level to ensure the water level of the swimming pool is suitable for the swimming pump to start, i.e., to confirm whether the swimming pump is in the evacuated state or not. When the detected water level is lower than the preset depth value, it is needed to start the filter pump to evacuate the swimming pump.

First Embodiment

Figure 2:
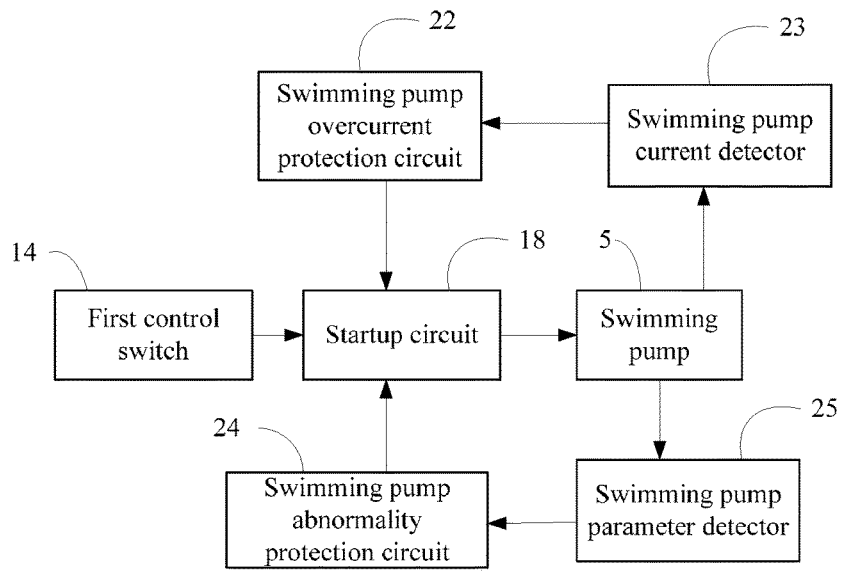
FIG. 2 illustrates a schematic diagram of a swimming pump protective mechanism according to the present disclosure.

The present embodiment realizes the protection of the swimming pump on the basis of the water flow control device for swimming training. The water flow control device for swimming training further comprises a swimming pump overcurrent protective mechanism. As illustrated in FIG. 2, the swimming pump overcurrent protective mechanism comprises a swimming pump current detector 23 for detecting current in the swimming pump 5 and a swimming pump overcurrent protective circuit 22 connected with the swimming pump current detector 23. The swimming pump overcurrent protective circuit 22 is connected with a start circuit 18 in the swimming pump. In this embodiment, the overcurrent protective mechanism is included to realize the safety monitoring of the swimming pump 5, when the over-current occurs in the swimming pump 5, the start circuit 18 in the swimming pump is automatically shut off to stop the swimming pump 5 and protect the swimming pump.

Second Embodiment

The present embodiment further realizes the protection of the swimming pump on the basis of the above-described water flow control device for swimming training or the first embodiment. As illustrated in FIG. 2, the water flow control device further comprises a swimming pump abnormality protective mechanism, which comprising a swimming pump parameter detector 25 for detecting an operation state of the swimming pump 5 and a swimming pump abnormality protective circuit 24 connected with the swimming pump parameter detector 25. The swimming pump abnormality protective circuit 24 is further connected with the start circuit 18 in the swimming pump. By detecting the operation parameters of the swimming pump in real time through the swimming pump abnormality protective mechanism in this embodiment, once the operation parameter is abnormal, the start circuit 18 in the swimming pump will be automatically cut off to stop the swimming pump. Further, parameters detected by the swimming pump parameter detector 25 generally include a rotational speed value and a temperature value of the swimming pump during operation.

Third Embodiment

Figure 3:
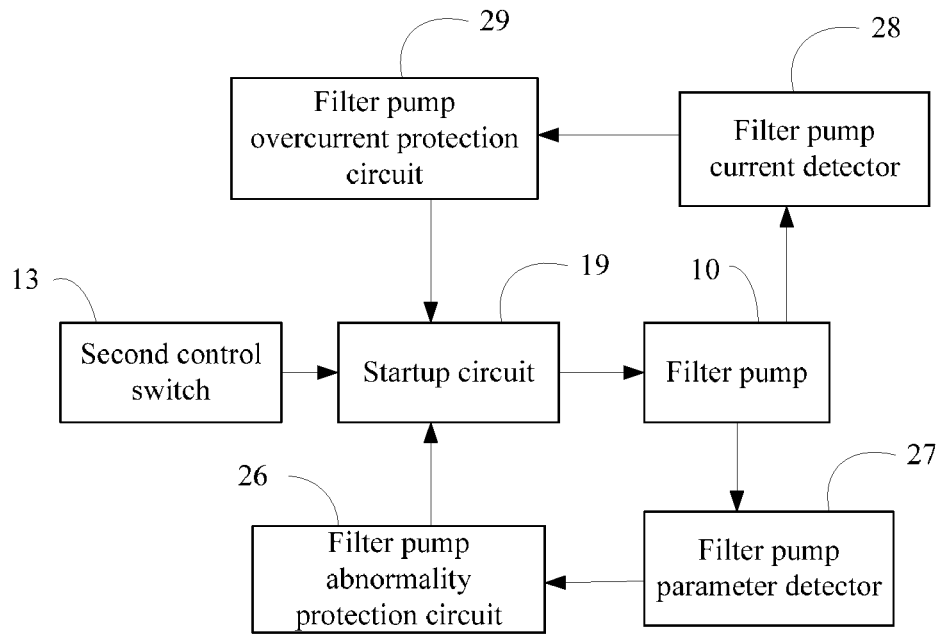
FIG. 3 illustrates a schematic diagram of a filter pump protective mechanism according to the present disclosure.

The present embodiment realizes the protection of the filter pump on the basis of the water flow control device for swimming training. In this embodiment, the water flow control device further comprises a filter pump overcurrent protective mechanism. As illustrated in FIG. 3, the filter pump overcurrent protective mechanism comprises a filter pump current detector 28 for detecting current in the filter pump 10 and a filter pump overcurrent protective circuit 29 connected with the filter pump current detector 28. The filter pump overcurrent protection circuit 28 is further connected with a start circuit 19 in the filter pump. By detecting the current of the filter pump in real time through the filter pump current detector 28 in this embodiment, when the current exceeds the rated current of the filter pump, the start circuit 19 in the filter pump will be cut off through the filter pump overcurrent protective circuit 29 to stop the filter pump and protect the filter pump.

Fourth Embodiment

The present embodiment further realizes the protection of the filter pump on the basis of the above-described water flow control device for swimming training or the third embodiment. The water flow control device in this embodiment further comprises a filter pump abnormality protective mechanism. As illustrated in FIG. 3, the filter pump abnormality protective mechanism comprises a filter pump parameter detector 27 for detecting an operation state of the filter pump 10 and a filter pump abnormality protective circuit 26 connected with the filter pump parameter detector 27. The filter pump abnormality protection circuit 26 is further connected with the start circuit 19 in the filter pump. By detecting the operation parameters of the filter pump in real time through the filter pump abnormality protective mechanism in this embodiment, once the operation parameter is abnormal, the start circuit 19 in the filter pump will be automatically cut off to stop the filter pump. Further, parameters detected by the filter pump parameter detector generally include a rotational speed value and a temperature value of the filter pump 10 during operation.

Fifth Embodiment

This embodiment is based on the water flow control device for swimming training in the above-mentioned embodiments. In this embodiment, the water flow control device further comprises a 230V/120V power supply (i.e., the power supply 4 illustrated in FIG. 1), one side of the power supply is connected with the swimming pump 5 and the filter pump 10, and the other side connected with the main controller through a step down circuit. Herein, the step down circuit is the voltage regulation circuit 17 in FIG. 1. Further, the step down circuit is with a manual start switch, that is the emergency switch 16 in FIG. 1, and the emergency switch 16 may be pressed down under an emergency situation to stop the operation of the entire water flow control device.

Sixth Embodiment

This embodiment is based on the water flow control device for swimming training in the above-mentioned embodiments. The filter pump is a 12V low-voltage motor pump. Based on the fifth embodiment, the mentioned power supply is connected with the filter pump through a voltage transformation circuit to realize low working voltage of the filter pump.

Seventh Embodiment

This embodiment is based on the water flow control device for swimming training in the above-mentioned embodiments. A flow control valve 20 is included on the main water outlet pipe. The flow control valve 20 is a manual control valve or a remote control valve and is connected with the main controller. In this embodiment, the amount of water outlet from the jet nozzle 11 may be adjusted according to the flow control valve to achieve a good effect of water flow for better training.

The above-mentioned water flow control method further comprises adjusting the amount of water flow from the main water outlet pipe: the amount of water outlet from the jet nozzle 11 is dynamically adjusted by controlling the flow control valve 20.

Figure 8:
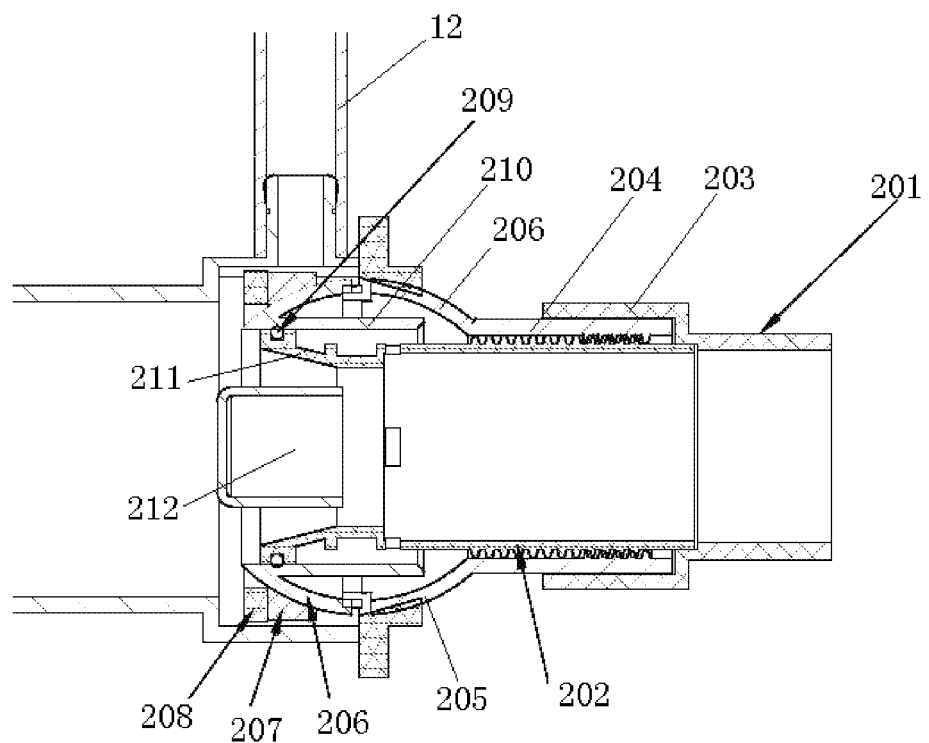
FIG. 8 illustrates a structural view of a flow control valve according to the present disclosure.

If the flow control valve is a manual control valve, a specific structure thereof may be configured as shown in FIG. 8, which may comprise a fixed first pipe and a second pipe connected with the first pipe. The first pipe has a columnar plug core 212, a cylindrical inner pipe wall 210 and an arc-shaped outer pipe wall 206. All are arranged in a spaced manner from inside to outside along a radial direction on the first pipe, and the space between the plug core 212 and the inner pipe wall 210 is communicated with the main water outlet pipe 8. The second pipe comprises a rotatable main pipe and an auxiliary pipe 204 which sleeved on the main pipe through threads. The auxiliary pipe 204 has an arc-shaped pipe wall 205, which is fixedly connected with the outer pipe wall 206. The main pipe has a radiated flared portion 211, which is inserted between the plug core 212 and the inner pipe wall 210. The maximum outer diameter of the flared portion 211 is equal to the inner diameter of the inner pipe wall 210, and the relative position between the flared portion 211 and the plug core 212 may be changed by rotating the main pipe and thereby adjust the amount of water inlet.

In this embodiment, the main pipe in the second pipe can move forward and backward relative to the first pipe, when the main pipe moves forward, i.e., the main pipe moves far away from the first pipe, the flared portion 211 also moves far away from the first pipe, the gap between the flared portion 211 and the plug core 212 is increased and thereby the amount of water entering the main pipe from the main water outlet pipe 8 is increased, i.e., the amount of water outlet from the jet nozzle 11 is increased; when the main pipe moves backward, i.e., the main pipe moves close to the first pipe, the flared portion moves close to the first pipe, the gap between the flared portion 211 and the plug core 212 is decreased and thereby the amount of the water entering the main pipe from the main water outlet pipe 8 is decreased, i.e., the amount of water outlet from the jet nozzle 11 is decreased. In this embodiment, the forward and backward movement of the main pipe in the second pipe relative to the first pipe is realized by rotating the main pipe.

The above-described main pipe is formed by two pipe sections by ultrasonic welding, one end of one pipe section 202 has the flared portion 221, the outer surface of the other end of one pipe section 202 has a threaded section which is screwed to the auxiliary pipe 204, and the outer surface of the other pipe section 201 has a rotating part 203 protruding radially. Rotating the rotating part 203 to rotate the main pipe and thereby the main pipe move forward and backward relative to the auxiliary pipe 204 and the first pipe.

In this embodiment, when the flow control valve is installed on the main water outlet pipe, a sealing ring 208 and a sealing pad 207 are included at the junction between the first pipe and the main water outlet pipe 8; the inner side surface of the inner pipe wall of the first pipe has a seal ring 209; the sealing ring 208, the sealing pad 207 and the seal ring 209 are included for sealing the connection between the pipes for better sealing.

Eighth Embodiment

This embodiment is based on the water flow control device for swimming training in the above-mentioned embodiments. The main controller has a wireless communication module 31 and communicated with the first control switch 14 and the second control switch 13, respectively, via the wireless communication module 31. In this embodiment, by adopting the wireless communication device, the control of the water flow control device can be more conveniently realized. For better use, the main controller is a wearable device or a portable electronic terminal.

Ninth Embodiment

This embodiment is based on the water flow control device for swimming training in the above-mentioned embodiments. The filter sterilization device comprises a sand filter module, a carbon filter module, a filter element filter module and an UV sterilization module. The filter sterilization device in this embodiment filter the water in the swimming pool in time.

Since the filter pump 10 is further connected with the filter sterilization device 9, the water flow control method for swimming training further comprises starting the filter pump 10, which pumped water from the swimming pool 3 into a filter sterilization device 9 to form a third state of water circulation. The third state of water circulation in this embodiment filter and sterilize the water in the swimming pool.

Based on the second embodiment and fourth embodiment, the water flow control method may further comprise detecting whether the swimming pump and the filter pump are overcurrent or not. The swimming pump overcurrent protective mechanism detects the current of the swimming pump, when the load has overcurrent, cuts off the start circuit, stops the swimming pump, and then the filter pump overcurrent protective mechanism detects the current of the filter, where the filter pump overcurrent protective mechanism described in embodiment 4 may be employed). When the load has overcurrent, cut off the start circuit, stop the filter pump. In this embodiment, the overcurrent detection may be implemented by the swimming pump overcurrent protective mechanism described in the second embodiment and the filter pump overcurrent protective mechanism described in the fourth embodiment.

Based on the third embodiment and fifth embodiment, the water flow control method may further comprise detecting whether the swimming pump and the filter pump are abnormal or not. The first abnormality protective mechanism detects the operation state of the swimming pump. When the operation state is abnormal, cut off the start circuit and stop the swimming pump. The second abnormality protective mechanism detects the operation state of filter pump. When the operation state is abnormal, cut off the start circuit and stop the filter pump. In this embodiment, the abnormality detection may be implemented by the swimming pump abnormality protective mechanism described in the third embodiment and the filter pump abnormality protective mechanism described in the fourth embodiment.

To sum up, the water flow control device for swimming training in accordance with the present disclosure, as the filter water outlet pipe of the filter pump is in communicated with the main water inlet pipe and the main water inlet pipe is the water inlet pipe of the swimming pump, the swimming pump realizes the vacuum by starting up the filter pump and then initial start the water circulation without manual external force, so that the water flow control device in accordance with the instant disclosure can form a water circulating effect at the beginning. Therefore, the present disclosure effectively overcomes shortcomings of the prior art and thus has a great industrial utilization value.

The above-mentioned embodiments are just used for exemplarily describing the principle and effects of the present disclosure instead of limiting the present disclosure. One skilled in the art may make modifications or variations to the above-mentioned embodiments without departing from the spirit and scope of the present disclosure. Therefore, all equivalent modifications or variations made by one skilled in the art without departing from the spirit and technical concept disclosed by the present disclosure shall be still covered by the claims of the present disclosure.

What is claimed is:

1. A water flow control device for swimming training, comprising:
    a swimming training device, comprising at least a swimming pump, and a main water inlet pipe and a main water outlet pipe connected with said swimming pump, a water inlet of said main water inlet pipe communicated with a swimming pool and a water outlet of said main water outlet pipe connected with a jet nozzle;
    a filter device, comprising at least a filter pump, a filter sterilization device, and a filter water inlet pipe and a filter water outlet pipe connected with said filter pump, said filter water inlet pipe communicated with said swimming pool through said filter sterilization device and said filter water outlet pipe communicated with said main water inlet pipe; and
    a control device, comprising a main controller, a first control switch for controlling start and stop of said swimming pump, a second control switch for controlling start and stop of said filter pump, and a water level sensor for detecting a water level in said main water inlet pipe, said first control switch, said second control switch and said water level sensor all connected with said main controller.

2. The water flow control device for swimming training of claim 1, further comprising a swimming pump overcurrent protective mechanism, which comprising a swimming pump current detector for detecting current in said swimming pump, and a swimming pump overcurrent protective circuit connected with said swimming pump current detector, wherein said swimming pump overcurrent protective circuit connected with the start circuit in said swimming pump.

3. The water flow control device for swimming training of claim 1, further comprising a swimming pump abnormality protective mechanism, which comprising a swimming pump parameter detector for detecting operating state of said swimming pump, and a swimming pump abnormality protective circuit connected with said swimming pump parameter detector, wherein said swimming pump abnormality protective circuit connected with the start circuit in said swimming pump.

4. The water flow control device for swimming training of claim 3, wherein the swimming pump parameters detected by said swimming pump parameter detector include a rotational speed value and a temperature value of the swimming pump during operation.

5. The water flow control device for swimming training of claim 1, further comprising a filter pump protective mechanism, which comprising a filter pump current detector for detecting current in said filter pump, and a filter pump overcurrent protective circuit connected with said filter pump current detector, wherein said filter pump overcurrent protective circuit connected with the start circuit in said filter pump.

6. The water flow control device for swimming training of claim 1, further comprising a filter pump abnormality protective mechanism, which comprising a filter pump parameter detector for detecting operating state of said filter pump, and a filter pump abnormality protective circuit connected with said filter pump parameter detector, wherein said filter pump abnormality protective circuit connected with a start circuit in said filter pump.

7. The water flow control device for swimming training of claim 6, wherein the filter pump parameters detected by said filter pump parameter detector include a rotational speed value and a temperature value of said filter pump during operation.

8. The water flow device for swimming training of claim 1, further comprising a 230V/120V power supply, one side of said power supply connected with said swimming pump and said filter pump, and the other side connected with said main controller through a step-down circuit.

9. The water flow control device for swimming training of claim 8, wherein said step down circuit further comprises a manual start switch.

10. The water flow control device for swimming training of claim 8, wherein said filter pump is a 12V low-voltage motor pump, said power supply connected with said filter pump through a voltage transformation circuit.

11. The water flow control device for swimming training of claim 1, wherein said main water outlet pipe is configured with a flow control valve.

12. The water flow control device for swimming training of claim 11, wherein said flow control valve is a manual control valve.

13. The water flow control device for swimming training of claim 11, wherein said flow control valve is a remote control valve connected with said main controller.

14. The water flow control device for swimming training of claim 1, wherein said main controller comprises a wireless communication module and communicated with said first control switch and said second control switch, respectively, via the wireless communication module.

15. The water flow control device for swimming training of claim 14, wherein said main controller is a wearable device or a portable electronic terminal.

16. The water flow control device for swimming training of claim 1, wherein said filter sterilization device comprises a sand filter module, a carbon filter module, a filter element filter module and an UV sterilization module.

* * * * *